(12) United States Patent
Malliah et al.

(10) Patent No.: US 11,363,028 B2
(45) Date of Patent: *Jun. 14, 2022

(54) SYSTEMS AND METHODS FOR DELEGATING ACCESS TO A PROTECTED RESOURCE

(71) Applicant: The Toronto-Dominion Bank, Toronto (CA)

(72) Inventors: Avinash Malliah, Toronto (CA); Mervin Gan, Etobicoke (CA); Haitian Yan, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 261 days.

This patent is subject to a terminal disclaimer.

(21) Appl. No.: 16/143,781

(22) Filed: Sep. 27, 2018

(65) Prior Publication Data

US 2020/0106780 A1    Apr. 2, 2020

(51) Int. Cl.
*H04L 29/06*    (2006.01)
*H04L 9/40*    (2022.01)
*G06F 16/435*    (2019.01)

(52) U.S. Cl.
CPC .......... *H04L 63/102* (2013.01); *G06F 16/437* (2019.01); *H04L 63/20* (2013.01)

(58) Field of Classification Search
CPC ...... H04L 63/102; H04L 63/20; G06F 16/437
(Continued)

(56) References Cited

U.S. PATENT DOCUMENTS 6,324,523 B1    11/2001 Killeen, Jr. et al.
6,484,258 B1 *  11/2002 Haverty .................. H04L 12/22
                                                                    713/155
(Continued)

FOREIGN PATENT DOCUMENTS

JP    2003296116 A  * 10/2003
JP    2003296175 A  * 10/2003

OTHER PUBLICATIONS

Elliott, Aaron, and Scott Knight. "Towards managed role explosion." In Proceedings of the 2015 New Security Paradigms Workshop , pp. 100-111. 2015. (Year: 2015).*

(Continued)

*Primary Examiner* — Luu T Pham
*Assistant Examiner* — Walter J Malinowski
(74) *Attorney, Agent, or Firm* — Rowand LLP

(57) ABSTRACT

A method for managing access privileges is disclosed. The method includes: obtaining, based on employee data received from a first client server having access to a human resources database of an organization, a first indication identifying a change in a first employee structure of the organization, the first employee structure indicating an employee status associated with each of one or more of the employees; retrieving permissions data defining access privileges associated with one or more employee statuses within the first employee structure for accessing a protected resource; and updating a user permissions database associated with the protected resource to indicate a change in access privileges for at least one employee of the organization based on the first indication and the permissions data, the user permissions database indicating access privileges for employees of the organization that are authorized to access the protected resource.

14 Claims, 7 Drawing Sheets

(58) Field of Classification Search
USPC .......................................................... 726/2
See application file for complete search history.

(56) References Cited

U.S. PATENT DOCUMENTS

| | | | | |
|---|---|---|---|---|
| 7,475,812 | B1* | 1/2009 | Novozhenets | G07C 9/28 235/382 |
| 7,523,506 | B1* | 4/2009 | Kumar | G06F 21/629 726/2 |
| 7,665,139 | B1* | 2/2010 | Szor | G06F 21/56 726/24 |
| 7,831,460 | B1* | 11/2010 | Jones-Morton | G06Q 10/10 705/7.14 |
| 7,890,398 | B2 | 2/2011 | Miri et al. | |
| 8,051,098 | B2 | 11/2011 | Bisbee et al. | |
| 8,474,028 | B2* | 6/2013 | Kulkarni | H04L 63/18 726/9 |
| 8,479,302 | B1 | 7/2013 | Lin | |
| 8,832,466 | B1* | 9/2014 | McGregor, Jr. | H04L 9/3242 380/37 |
| 8,880,027 | B1* | 11/2014 | Darringer | H04M 1/67 455/411 |
| 8,931,057 | B2* | 1/2015 | Cicchitto | G06F 21/6218 726/4 |
| 9,235,839 | B2 | 1/2016 | Dua | |
| 9,313,207 | B2* | 4/2016 | Cicchitto | G06F 21/6218 |
| 9,787,681 | B2 | 10/2017 | Clancy, III et al. | |
| 9,838,388 | B2 | 12/2017 | Mather et al. | |
| 9,888,039 | B2* | 2/2018 | Elliot | H04L 63/08 |
| 10,063,537 | B2* | 8/2018 | Zhu | H04L 63/126 |
| 10,122,757 | B1* | 11/2018 | Kruse | H04L 63/10 |
| 11,157,643 | B2* | 10/2021 | Malliah | H04W 12/084 |
| 2003/0023874 | A1* | 1/2003 | Prokupets | G07C 9/20 726/4 |
| 2003/0187993 | A1* | 10/2003 | Ribot | G06F 21/6218 709/227 |
| 2005/0086521 | A1* | 4/2005 | Chen | H04L 63/101 726/4 |
| 2005/0097149 | A1* | 5/2005 | Vaitzblit | G06F 21/6227 |
| 2005/0138394 | A1* | 6/2005 | Poinsenet | G06F 21/32 713/186 |
| 2006/0085243 | A1* | 4/2006 | Cooper | G06Q 10/06 705/7.42 |
| 2006/0095420 | A1* | 5/2006 | Ikegami | G06F 16/9535 |
| 2006/0211404 | A1* | 9/2006 | Cromp | G06Q 10/10 455/405 |
| 2007/0006284 | A1* | 1/2007 | Adams | H04L 63/10 726/4 |
| 2007/0208669 | A1* | 9/2007 | Rivette | G06Q 50/184 705/59 |
| 2007/0233531 | A1* | 10/2007 | McMahon | G06Q 10/063114 705/7.15 |
| 2008/0098464 | A1* | 4/2008 | Mizrah | G06F 21/36 726/5 |
| 2008/0189793 | A1* | 8/2008 | Kirkup | G06F 21/604 726/27 |
| 2009/0177741 | A1* | 7/2009 | Tian | H04L 63/102 709/203 |
| 2010/0016919 | A1 | 1/2010 | Hill et al. | |
| 2010/0082396 | A1* | 4/2010 | Caldwell | G06Q 10/063116 705/7.16 |
| 2010/0100427 | A1* | 4/2010 | McKeown | G06Q 10/1057 705/322 |
| 2011/0231221 | A1* | 9/2011 | Worwetz | G06Q 10/06 705/7.28 |
| 2011/0258683 | A1* | 10/2011 | Cicchitto | H04L 63/102 726/4 |
| 2012/0060163 | A1* | 3/2012 | Khan | H04L 41/5074 718/103 |
| 2012/0179657 | A1* | 7/2012 | Delafortrie | G06Q 10/105 707/687 |
| 2012/0179711 | A1* | 7/2012 | Delafortrie | G06F 16/2315 707/769 |
| 2013/0024910 | A1* | 1/2013 | Verma | H04L 51/32 726/3 |
| 2013/0047089 | A1* | 2/2013 | Kulathungam | H04L 67/1095 715/739 |
| 2013/0086299 | A1* | 4/2013 | Epstein | G06F 12/1433 711/6 |
| 2014/0019880 | A1* | 1/2014 | Kucera | H04L 51/32 715/753 |
| 2016/0217424 | A1* | 7/2016 | Challenger | G06Q 10/067 |
| 2016/0217470 | A1 | 7/2016 | Gerard et al. | |
| 2017/0195329 | A1 | 7/2017 | Feng et al. | |
| 2018/0218367 | A1* | 8/2018 | Mendoza | G06Q 20/20 |
| 2018/0288065 | A1* | 10/2018 | Selgas | H04L 63/0884 |
| 2018/0295105 | A1* | 10/2018 | Feng | H04W 4/80 |
| 2019/0036965 | A1* | 1/2019 | Luo | H04L 45/74 |
| 2019/0172281 | A1* | 6/2019 | Einberg | G06K 9/00255 |
| 2020/0104521 | A1* | 4/2020 | Malliah | G06F 16/90 |

OTHER PUBLICATIONS

Chadwick, David W. "Important lessons derived from X. 500 case studies." IEEE Network 10, No. 2 (1996): 22-34. (Year: 1996).*

Asaf, Zeeshan, Muhammad Asad, Shafique Ahmed, Waqas Rasheed, and Tariq Bashir. "Role based access control architectural design issues in large organizations." In 2014 International Conference on Open Source Systems & Technologies, pp. 197-205. IEEE, 2014. (Year: 2014).*

Narayanan, Hema Andal Jayaprakash, and Mehmet Hadi Günes. "Ensuring access control in cloud provisioned healthcare systems." In 2011 IEEE Consumer Communications and Networking Conference (CCNC), pp. 247-251. IEEE, 2011. (Year: 2011).*

Paradies, Marcus, Michael Rudolf, Christof Bornhövd, and Wolfgang Lehner. "GRATIN: accelerating graph traversals in main-memory column stores." In Proceedings of Workshop on GRAph Data management Experiences and Systems, pp. 1-6. 2014. (Year: 2014).*

Pan, Ning, Lei Sun, Liang-Sheng He, and Zhi-Qiang Zhu. "An approach for hierarchical RBAC reconfiguration with minimal perturbation." IEEE Access 6 (2017): 40389-40399. (Year: 2017).*

* cited by examiner

SYSTEMS AND METHODS FOR DELEGATING ACCESS TO A PROTECTED RESOURCE

TECHNICAL FIELD

The present disclosure relates to data processing systems and, more particularly, to systems and methods for managing computer access control systems.

BACKGROUND

In network computing, a host may maintain a protected resource, such as a private database, that is accessible to clients. Typically, the host may operate an access control system for enforcing security and privacy requirements of the protected resource. In particular, the host may implement an access control process for the protected resource, by defining an authorization policy, which specifies the operations that different clients are allowed to execute when accessing the protected resource, and configuring user permissions to enforce the authorization policy.

A protected resource may include client data for a plurality of clients. For example, client data may be stored in one or more user accounts that are maintained at the protected resource. A client account may be accessed to obtain, add to, modify, or delete client data, execute or authorize certain actions via the account, and/or change or update account settings. Such actions may only be initiated by authorized representatives of the clients. More generally, access controls may be implemented to ensure that only the individuals having the requisite permissions may perform or authorize actions associated with client accounts at the protected resource.

When a client is an organization, multiple individuals within the organization may be granted permission to access the client accounts and to execute one or more of the available user account actions. The levels of authorization for these individuals may vary. In particular, the access privileges of authorized individuals in a client organization may depend on numerous factors, such as an employee's role within the organization. An authorization level for an employee may depend on, for example, work experience, level of seniority, job title, geographic location, and responsibilities.

Accordingly, an access control system for a protected resource may maintain, for each client organization, a database of authorized individuals and their respective access privileges. Traditional methods of managing access to client accounts have relied on manual update of clients' employee data and associated permissions data at the access control system. This manual approach of controlling user access and authorizations is often inefficient and can increase the risk of human error in managing access privileges. Furthermore, manual updating of access privilege data for a client may cause information lags, which can lead to unauthorized access or incorrect user permissions that pose a threat to the security and integrity of data in a protected resource or unduly limit the scope of user account actions which may be undertaken by a client.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
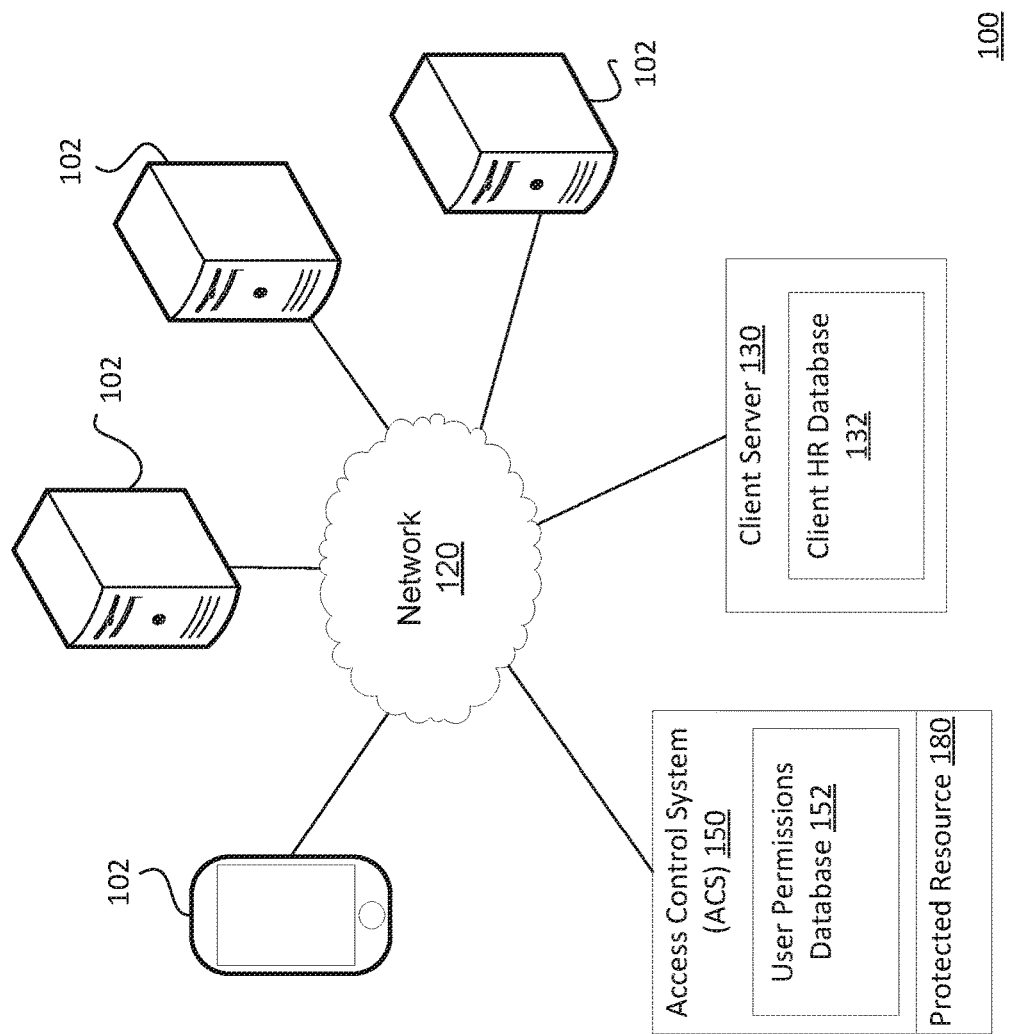
FIG. 1 is a schematic diagram illustrating an operating environment of an example embodiment.

In one aspect, the present disclosure describes a computing system. The computing system includes a memory, a communications module that is communicable with an external network, and a processor coupled to the memory and the communications module. The processor is configured to: obtain, based on employee data received from a first client server having access to a human resources database of an organization, a first indication identifying a change in a first employee structure of the organization, the first employee structure indicating an employee status associated with each of one or more of the employees; retrieve permissions data defining access privileges associated with one or more employee statuses within the first employee structure for accessing a protected resource; and update a user permissions database associated with the protected resource to indicate a change in access privileges for at least one employee of the organization based on the first indication and the permissions data, the user permissions database indicating access privileges for employees of the organization that are authorized to access the protected resource.

In another aspect, the present disclosure describes a method for managing access privileges. The method includes: obtaining, based on employee data received from a first client server having access to a human resources database of an organization, a first indication identifying a change in a first employee structure of the organization, the first employee structure indicating an employee status associated with each of one or more of the employees; retrieving permissions data defining access privileges associated with one or more employee statuses within the first employee structure for accessing a protected resource; and updating a user permissions database associated with the protected resource to indicate a change in access privileges for at least one employee of the organization based on the first indication and the permissions data, the user permissions database indicating access privileges for employees of the organization that are authorized to access the protected resource.

In yet another aspect, the present disclosure describes a computer-readable medium storing instructions that, when executed, cause a computing system to: obtain, based on employee data received from a first client server having access to a human resources database of an organization, a first indication identifying a change in a first employee structure of the organization, the first employee structure indicating an employee status associated with each of one or more of the employees; retrieve permissions data defining access privileges associated with one or more employee statuses within the first employee structure for accessing a protected resource; and update a user permissions database associated with the protected resource to indicate a change in access privileges for at least one employee of the organization based on the first indication and the permissions data, the user permissions database indicating access privileges for employees of the organization that are authorized to access the protected resource.

In yet another aspect, the present disclosure describes a computing system. The computing system includes a memory, a communications module that is communicable with an external network, and a processor coupled to the memory and the communications module. The processor is configured to: receive, from a first client server having access to a human resources database of an organization, a first employee structure indicating an employee status associated with each of one or more employees of the organization; receive, from a requesting device, a first request to change access privilege of a first employee for accessing a protected resource; generate a second request to obtain approvals for changing the access privilege of the first employee; and selectively transmit the second request to one or more second employees of the organization, the one or more second employees being identified based on the first employee structure.

In at least one embodiment, the one or more second employees include at least one employee of the organization having a higher hierarchical rank than the first employee in a first employee hierarchy of the organization.

In at least one embodiment, the one or more second employees are determined based on a default rule for obtaining approval of changes in access privileges for the protected resource.

In at least one embodiment, the one or more second employees are determined based on at least one approval chain representing one or more predetermined sets of employees that are authorized to provide approval for the change in access privilege for the first employee.

In at least one embodiment, selectively transmitting the second request to the one or more second employees comprises: transmitting the second request to one of the second employees with a time-out condition that specifies a predefined time-out period; and in response to expiry of the time-out period, transmitting the second request to a different one of the second employees with the time-out condition.

In at least one embodiment, selectively transmitting the second request to the one or more second employees comprises transmitting the second request to two or more of the second employees concurrently.

In at least one embodiment, selectively transmitting the second request to the one or more second employees comprises transmitting a message requesting approval for the change in access privilege for the first employee.

In yet another aspect, the present disclosure describes a computing system. The computing system includes a memory, a communications module that is communicable with an external network, and a processor coupled to the memory and the communications module. The processor is configured to: receive, from a first client server having access to a human resources database of an organization, a first employee structure indicating an employee status associated with each of one or more employees of the organization; receive, from a requesting device, a first request to execute a first action; generate a second request to obtain approval for executing the first action; select one or more first employees of the organization based on the first employee structure; and selectively transmit the second request to the one or more first employees.

In some implementations, the processor may be configured to determine at least one first condition associated with approvals that are required for executing the first action.

In some implementations, selectively transmitting the second request to the one or more first employees may include: identifying the one or more first employees based on determining that approvals from the one or more first employees satisfy the at least one first condition; and transmitting the second request concurrently to the one or more first employees.

In some implementations, the processor may be configured to receive, from at least one of the first employees, indications of approval for executing the first action.

In some implementations, the processor may be configured to execute the first action in response to receiving at least one indication of approval for executing the first action.

In some implementations, selectively transmitting the second request may include: transmitting the second request to a first one of the first employees; in response to receiving an indication of approval from the first one of the first employees: determining whether indications of approval received at the computing system satisfy the at least one first condition; and in response to determining that the indications of approval received at the computing system do not satisfy the at least one first condition, transmitting the second request to a different one of the first employees.

In some implementations, selectively transmitting the second request may include: transmitting the second request to a first one of the first employees; in response to determining that an indication of approval for executing the first action is not received from the first one of the first employees prior to expiry of a time-out period, transmitting the second request to a second one of the first employees.

In some implementations, the second one of the first employees may be selected based on determining that the second one of the first employees has a same or higher rank as the first one of the first employees in an employee hierarchy of the organization.

In some implementations, the processor may be configured to: determine that indications of approval received at the computing system satisfy the at least one first condition; and notify the requesting device that execution of the first action is approved.

In some implementations, the at least one first condition may indicate a minimum number of approvals to obtain for executing the first action.

In some implementations, the at least one first condition may indicate employee statuses of employees whose approvals are required for executing the first action.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "protected resource" may cover various different types of resources which can be accessed by computer systems, such as databases, data files and folders, computing resources (e.g. network bandwidth, processing power, and memory), networks, servers, applications, account data, or tradeable objects. A protected resource may be accessed by nodes of a network; for example, a client node, or a node associated with an authorized representative of a client, may gain access to a protected resource to manage the client's user account(s) or perform certain authorized actions via the user account(s). A protected resource may be a stand-alone entity that is managed by a computer system, or it may be integrated as a component of a computer system. Access to a protected resource is restricted. In particular, a protected resource has an associated mechanism for limiting access to one or more components of the protected resource.

The term "access control", as used in the present application, may refer broadly to functions of a security system which implements services of authorization, identification and authentication, and/or access approval. A protected resource may have an associated access control system. More specifically, an access control system may be implemented to prevent unauthorized access of a protected resource and to enforce restrictions on permitted actions by authorized users of the protected resource. For example, an access control system may enforce rules to restrict access to user accounts at a data store to only those users that provide the access credentials associated with the user accounts.

An "access request" may refer to a request, by a client node, to access a particular resource. A client node may, for example, initiate an access request to gain access to a protected data resource. An access request may indicate, among others, identity of the requester (e.g. requester credentials), a type of access that is requested, and any desired action(s) to execute at the protected resource. An access request originating from a node of a network may be initiated by an owner or user of a computing system that is associated with the node. For example, a user of a computing device may initiate an access request via a user interface provided on a display of the computing device. An access request may be transmitted to a node associated with a server that maintains the protected resource. The server may then, by itself or through a third party, evaluate the access request and decide whether to approve or reject the request.

In an aspect, the present application discloses a system for managing access privileges for a protected resource. More specifically, an automated system for managing access and permissions data corresponding to a plurality of clients at a protected resource is disclosed. The system of the present disclosure is designed to enable real-time updates of access privilege data for employees of a client organization. In accordance with embodiments of the present disclosure, a computing system obtains an indication identifying a change in an employee structure of an organization. Employee structure data may, for example, be obtained from a human resources database of a client, and may identify employees and their associated employee status. For example, the employee structure data may include, among others, employee hierarchy data specifying a hierarchical rank for employees of the organization, employee location data specifying a geographic region (or office) of employees, employee title data specifying a title for each employee, and corporate identity data indicating the identity of each employee's immediate employer and corporate control structure for said employer. The computing system retrieves permissions data which defines access privileges associated with various employee statuses for accessing a protected resource. Based on the indication of change in employee structure and the retrieved permissions data, the computing system may update a user permissions database associated with the protected resource.

In at least some embodiments, the computing system may be configured to obtain employee structure data in real-time or on a periodic basis (e.g. daily, monthly, etc.). For example, the computing system may query, in real-time or on a pre-determined schedule, a client server associated with an organization in order to obtain the most recent employee structure data for the organization. The frequency of querying the client server for the employee structure data for an organization may depend, for example, on a desired frequency with which access privilege information for employees is to be provided ("pushed") from the organization. As another example, the client server may "push" employee structure data to the computing system. In particular, the client server may transmit the employee structure data to the computing system on a periodic basis (such as on a regular schedule) and/or upon the occurrence of a predefined trigger event. A trigger event may, for example, be an employee resignation, an employee termination, hiring of new employees, corporate restructuring (e.g. mergers, acquisitions), or assignment of new titles/roles/location. In the event of an employee resigning or being terminated, the employee identifier may be removed from the database, which may be equivalent to revoking all access for the employee.

In some embodiments, employee data obtained from the client (e.g. employee identifiers) may be "tagged" with corresponding permissions data. The "tagged" employee data set may be compared with previously stored employee structure data, such as employee hierarchy data, in order to determine whether there are any changes in access privileges for one or more employees of the client. Upon detecting a change in access privilege data for the employees, the user permissions database may be updated to reflect the detected change in access privileges.

In a further aspect, the present disclosure describes techniques by which access to client information/account at a protected resource may be granted. The decision to grant access and/or authorization permissions is based on a real-time assessment of access requests, where the assessment is informed by the client's current employee hierarchy data and an authorization policy indicating a mapping of hierarchical ranks to access privileges. An access request may be processed by an automated access control system for managing permissions data for clients and their employees. The system may be configured to retrieve the client's employee hierarchy, an authorization policy defining privileges corresponding to hierarchical ranks, and any previously approved access privileges for the employees of the client, in order to generate updated access and/or authorization permissions data. If an access request is approved, an express authorization to access the protected resource may be generated and transmitted to the requester.

In a further aspect, the present disclosure describes systems and methods for obtaining approvals of changes in access privileges for a protected resource from permissions management entities. When an access control system detects potential changes in access privileges for one or more employees of a client, the system may determine whether approvals are required for the changes to be accepted at the protected resource. A change in access privilege may be automatically approved, or it may be necessary to explicitly request for approval for the change from authorized entities. A request for approval may be transmitted to one or more individuals within the client organization, as determined by cross-referencing the client's employee hierarchy and one or more approval chains representing parties that are authorized to approve the particular change in access privileges.

Reference is first made to FIG. 1, which shows an exemplary operating environment 100 in accordance with embodiments of the present disclosure. FIG. 1 illustrates an exemplary access control system (ACS) 150 for a protected resource 180. The ACS 150 may implement processes for, among others, handling access request formalities, obtaining a client organization's employee hierarchy, updating access privilege data for entities authorized for access, requesting approval for detected changes in access privileges, and granting or denying access to entities requesting access to the protected resource.

The environment 100 includes a plurality of electronic devices 102. Each electronic device 102 is a computer system. An electronic device 102 may be associated with an entity requesting access to the protected resource 180, such as a consumer, a business, a system owner/administrator, or other parties desirous of accessing information (e.g. account data) and executing authorized actions at the protected resource.

In some embodiments, the electronic device 102 may be a portable electronic device. For example, the electronic device 102 may, as illustrated, be a smartphone. The electronic device 102 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In some embodiments, the electronic device 102 may include a smart card, chip card, integrated circuit card (ICC), and/or other card having an embedded integrated circuit.

The electronic device 102 is configured to execute software, such as a resource access requesting application (not shown). A resource access requesting application may, for example, be a web application (e.g. single-page application, or SPA), a mobile application, or a desktop application. In some embodiments, the resource access requesting application may be implemented as a component or feature of another application, such as a mobile banking or payment app. The resource access requesting application may be an app that can be used to request and apply for access to the protected resource 180. In some embodiments, the resource access requesting application may comprise a Web browser application that is configured to run and display a Web form interface for requesters to use when applying to gain access to the protected resource 180.

The network 120 is a computer network. The network 120 allows computer systems in communication therewith to communicate. For example, as illustrated, the network 120 may allow the electronic devices 102 to communicate with an access control system associated with the protected resource 180.

The access control system (ACS) 150 is implemented as part of a computer system. The ACS 150 may be implemented by one or more computing devices such as, for example, database servers, computer servers, and the like. For example, the ACS 150 may be implemented by servers that are connected to or integrated with resources accessible by a plurality of computing systems. As another example, the ACS 150 may be implemented by servers associated with a financial institution (e.g. bank, credit union, etc.) interfacing with devices associated with current and/or prospective customers of the financial institution. The computing devices may be in communication with each other using the network 120. Alternatively, the computing devices may communicate using another network such as, for example, a local-area network (LAN). In some embodiments, the ACS 150 may be implemented by multiple computing devices organized in a tiered arrangement (e.g. middle-tier and back-end computing devices). In some embodiments, the ACS 150 may be provided by a cluster formed of a plurality of interoperating computing devices.

The ACS 150 may, in association with one or more different computer systems, handle various services relating to, among others, resource access request processing, employee hierarchy data retrieval, customer accounts data management, control of user interfaces for requesting access to resources, and access approval and authorization. FIG. 1 illustrates a user permissions database 152 which may be included as part of a computer system implementing the ACS 150. The user permissions database 152 may be integrated into the ACS 150 or it may be provided as a remote database that is communicably coupled to the computer system administering the ACS 150.

The user permissions database 152 may contain information identifying entities that are authorized to access the protected resource 180 and the authorization permissions associated with such entities. That is, the user permissions database 152 may include data indicating the access privileges of those entities that have previously been granted access to the protected resource 180. The user permissions database 152 may, for example, identify a plurality of user accounts at the protected resource, entities that are authorized to access the respective user accounts, and authorization permissions granted to the authorized entities. The user permissions database 152 may specify access privileges for individuals as well as for groups of individuals and entities (i.e. bulk authorizations).

A client server 130 is also illustrated in FIG. 1. The client server 130 may be associated with a client that has one or more accounts at the protected resource 180. The client server 130 is communicably connected to the network 120. The client server 130 has access to a client HR database 132, which includes employee data pertaining to employees of the client server 130. In particular, the client HR database 132 may indicate an employee hierarchy representing a hierarchy of job titles within the client organization. An employee's hierarchical rank within the employee hierarchy may be defined by, for example, a job title, geographic location of the employee's workplace/office, and/or the employer's position in corporate hierarchy (e.g. parent, subsidiary, etc.). The client server 130 may be remotely located with respect to a system which implements an ACS 150. In particular, the client server 130 and the ACS 150 may be implemented by remotely located computing systems that are connected via the network 120 and operated independently of each other.

Figure 2:
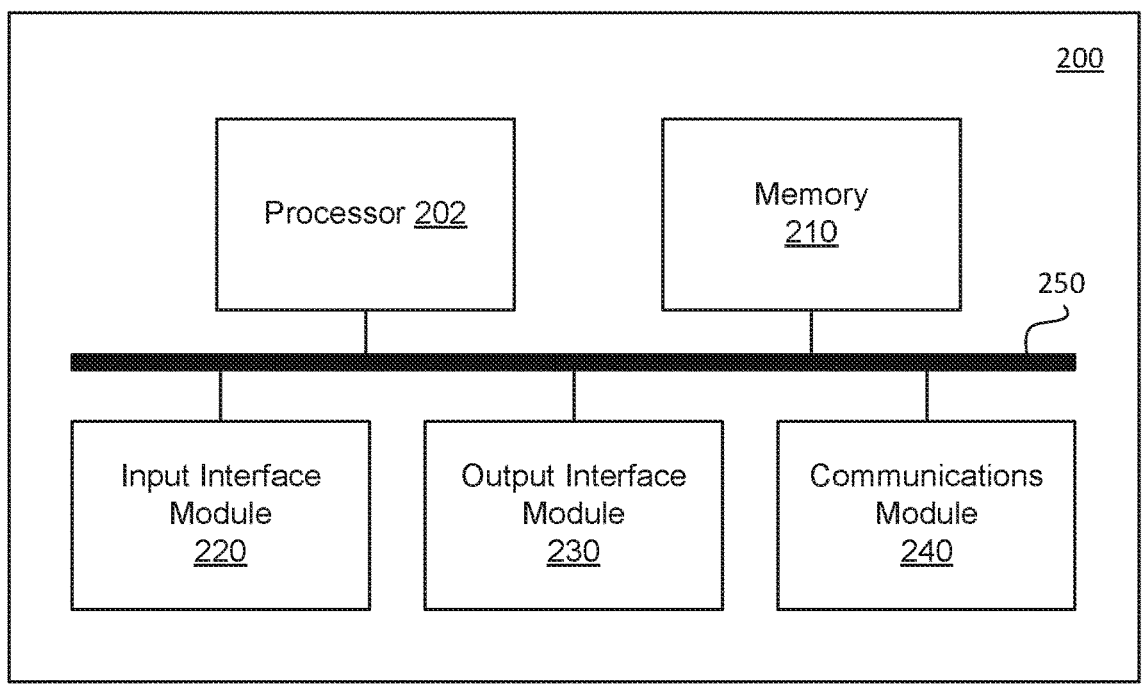
FIG. 2 is a high-level operation diagram of an example computing system for implementing example embodiments of an access control system.

FIG. 2 is a high-level operation diagram of an example computing system 200 that may be configured to implement an ACS 150. The computing system 200 of FIG. 2 includes a variety of modules. For example, as illustrated, the computing system 200 may include a processor 202, a memory 210, an input interface module 220, an output interface module 230, and a communications module 240. As illustrated, the foregoing example modules of the computing system 200 are in communication over a bus 250.

The processor 202 is a hardware processor. Processor 202 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 102.

The input interface module 220 allows the computing system 200 to receive input signals. Input signals may, for example, correspond to input received from a user. The input interface module 220 may serve to interconnect the computing system 200 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the computing system 200 to provide output signals. Some output signals may, for example allow provision of output to a user. The output interface module 230 may serve to interconnect the computing system 200 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the computing system 200 to communicate with other electronic devices and/or various communications networks. For example, the communications module 240 may allow the computing system 200 to send or receive communications signals. Communications signals may be sent or received according to one or more protocols or according to one or more standards. For example, the communications module 240 may allow the computing system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the computing system 200 to communicate using near-field communication (NEC), via Wi-Fi™, using Bluetooth™ or via some combination of one or more networks or protocols. Contactless payments may be made using NFC. In some embodiments, all or a portion of the communications module 240 may be integrated into a component of the computing system 200. For example, the communications module may be integrated into a communications chipset.

Software comprising instructions is executed by the processor 202 from a computer-readable medium. For example, software may be loaded into random-access memory from persistent storage of memory 210. Additionally or alternatively, instructions may be executed by the processor 202 directly from read-only memory of memory 210.

Figure 3:
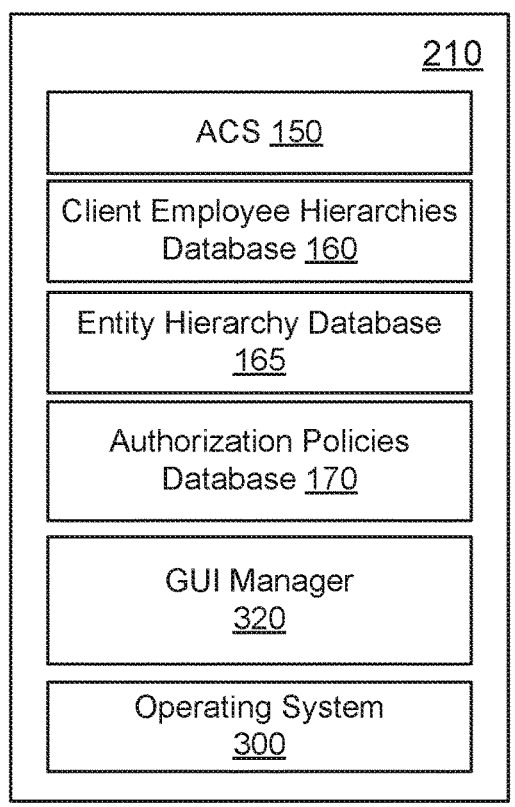
FIG. 3 depicts a simplified software organization of the example computing system of FIG. 2.

FIG. 3 depicts a simplified organization of software components stored in memory 210 of the computing system 200. As illustrated, these software components include an operating system 300, ACS 150, client employee hierarchy database 160, entity hierarchy database 165, authorization policies database 170, and a graphical user interface manager 320.

The operating system 300 is software. The operating system 300 allows the ACS 150 to access the processor 202, the memory 210, the input interface module 220, the output interface module 230 and the communications module 240. The operating system 300 may be, for example, Apple iOS™, Google™ Android™, Linux™, Microsoft™ Windows™, or the like.

The graphical user interface (GUI) manager 320 manages information that may be displayed on a user device when a user makes a manual request to gain access to a user account at a protected resource. When a user requests to access an account using its device, it is desirable to display information about the request that is specifically tailored for that user. For example, a requester may wish to view, via the user interface, relevant information for a user account such as: type of the account; owner of the account; authorized actions to be performed via the user account; history of access requests and approval decisions; options to retrieve updated permissions data for the account; and most recent update of permissions data. The GUI manager 320 may generate a user interface which can be displayed on the device of a requester, such that the requester can make a manual access request, to an access control system such as ACS 150, using the user interface. In particular, the GUI manager 320 may determine display data that should be rendered for a requesting user's device.

The client employee hierarchy database 160 comprises a repository of employee hierarchy information for authorized clients having access to the protected resource (e.g. clients with accounts at the protected resource). The client employee hierarchy database 160 may store, for one or more client organizations, employee data indicating, at least, a hierarchical job structure of the client organization and a rank of each employee within the employee hierarchy. The client employee hierarchy database 160 may be updated manually as entries are added to the database, updated periodically when requests for hierarchy data are transmitted to existing clients, or updated automatically when client servers push client HR data to the database (e.g. when client's employee hierarchy or list of employees changes).

The entity hierarchy database 165 may store data describing hierarchical relations between various entities which may have access to the protected resource. In particular, for one or more client organizations that are authorized to access the protected resource, the entity hierarchy database 165 may define a corporate hierarchy of entities within the client organization. For example, the entity hierarchy database 165 may contain data relating to client organizations, corporate hierarchies (e.g. parent-subsidiary relations) for the clients, and one or more of the corporate entities within the hierarchies. In some embodiments, the client employee hierarchy database 160 and the entity hierarchy database 165 may be integrated into a single data store containing employee-related information for authorized clients with access to the protected resource. In some embodiments, the entity hierarchy database 165 may be located within the computing system 200.

The authorization policies database 170 may include policies, for one or more client organizations, that define access and/or authorization permissions for various employment-related classifications. The authorization policies database 170 may define access privileges corresponding to, for example, hierarchical ranks in an employee hierarchy, corporate hierarchy of immediate employer/supervisor, or geographic location of place of employment. Each client may have its own policy outlining the access privileges that are granted to employees of the client. These policies may, for example, indicate a mapping of job titles (or geographic location, corporate identity of immediate employer, etc.) to access privileges that are specific to the client's account at a protected resource. The authorization policies database 170 may be a collection of such authorization policies for clients that have existing accounts at a protected resource. The authorization policies database 170 may, in some embodiments, be connected to one or both of the client employee hierarchy database 160 and the entity hierarchy database 165, which may allow access privilege mappings to be updated in accordance with changes to employee hierarchy data for clients.

In some embodiments, the memory 210 may also include a user accounts database containing account data for a plurality of users. The users may, for example, be customers of a business or institution, and the user accounts may maintain information relating to various assets and liabilities of those customers.

Figure 4:
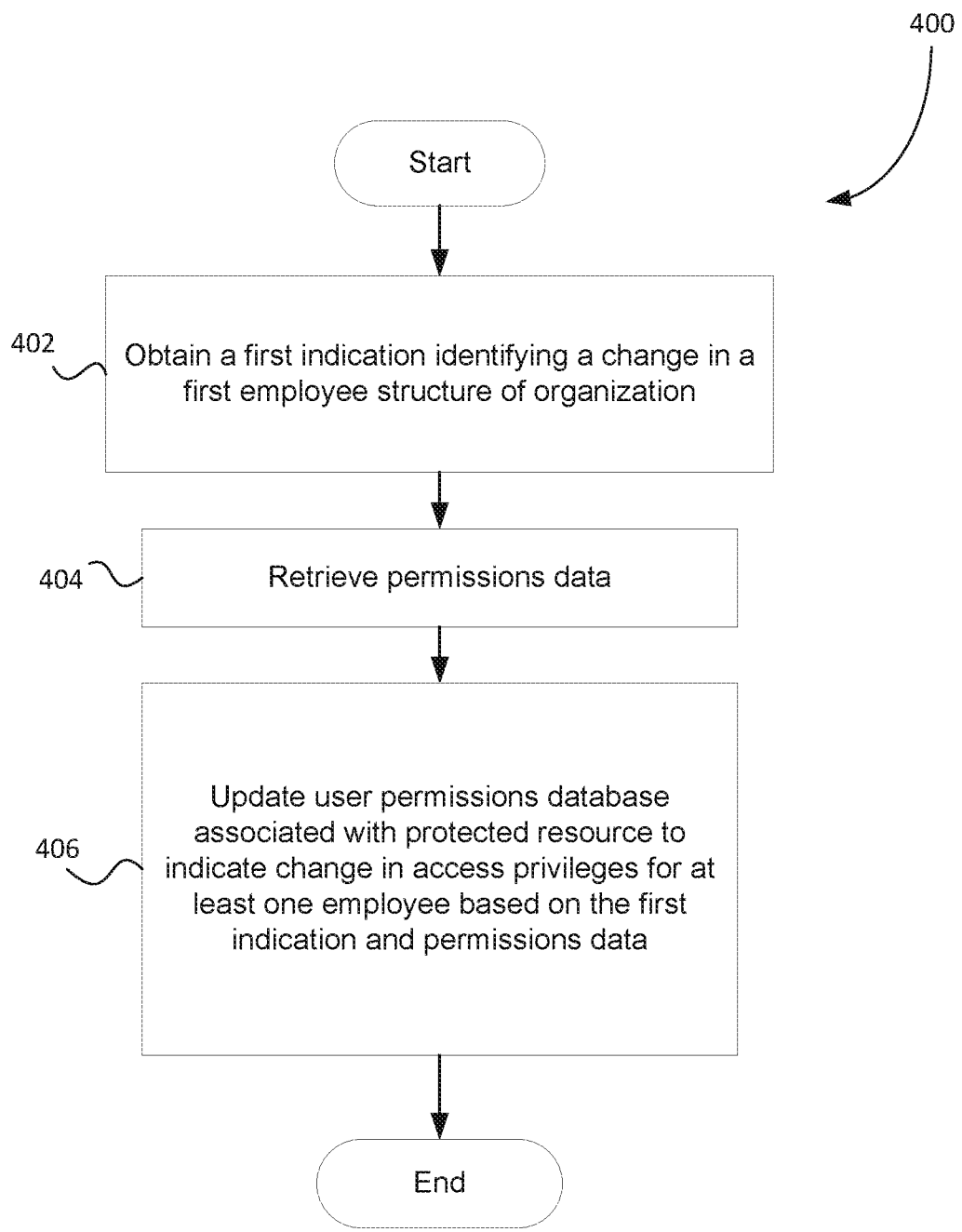
FIG. 4 shows, in flowchart form, an example method for managing access privileges for accessing a protected resource.

Reference is made to FIG. 4, which shows, in flowchart form, an example method 400 for managing access privileges for accessing a protected resource. The method 400 may be performed by a computing system, such as an ACS 150, that is configured to control access to a protected resource. The protected resource may, for example, be a client account in a private database. The computing system may be communicably coupled to a plurality of client devices corresponding to resource access requesting entities and client servers associated with protected client accounts in a database.

The computing system can obtain employee data from a client server having access to a human resources database of a client organization. In particular, in operation 402, the computing system obtains, based on client employee data received from a first client server, a first indication identifying a change in a first hierarchy of employees of the client organization. The first hierarchy indicates a hierarchical rank for each of one or more of the employees. The first indication may be retrieved by the computing system from the first client server, or it may be transmitted to the computing system (for example, by way of a push notification or message) by the first client server. For example, the computing system may periodically request employee hierarchy change information from the first client server, or query a database containing employee hierarchy data to identify any changes therein. The first indication may specify, among other information, changes in job title (or geographic location, immediate employer, etc.) of existing employees, new hires of employees, and/or removal of employees from the client's workforce.

In operation 404, the computing system retrieve permissions data which defines access privileges associated with one or more hierarchical ranks within the first hierarchy for accessing a protected resource. In some embodiments, the permissions data may indicate, for various job titles within an organization, the access and/or authorization permissions corresponding to the job titles. More generally, the permissions data may include a mapping of employee hierarchical ranks to access privileges for accessing the protected resource. The permissions data may be client-specific; that is, each client may generate its own permissions data. For example, the permissions data may be defined by an authorization policy associated with a client. The permissions data may be stored in a database that is accessible to the computing system, such as authorization policies database 170 of FIG. 3.

In some embodiments, the permissions data may define access privileges associated with other employment-related classifications (i.e. different from employee hierarchical rank) for accessing the protected resource. For example, the permissions data may specify access and/or authorization permissions for employees having a particular geographic location of employment. As another example, the permissions data may indicate access privileges for employees based on a corporate hierarchical rank of their immediate employer (or corporate identifier). The access privileges for the client's employees that are indicated by the permissions data may, in some cases, be based on combining access/authorization rules relating to two or more employment-related classifications. For example, in some embodiments, the access/authorization rules associated with an employee's employment-related classifications (e.g. job title, geographic location, corporate identifier) may be combined according to predetermined weightings of importance to obtain an access privilege for that employee.

In operation 406, the computing system updates a user permissions database associated with the protected resource to indicate a change in access privileges for at least one employee of the organization. The user permissions database indicates access privileges for employees of the organization that are authorized to access the protected resource. The update of the user permissions database is based on the first indication of change obtained from the first client server and the retrieved permission data. That is, the user permissions data may be updated to represent the change in the organization's employee hierarchy in the access privileges for one or more employees to access the protected resource.

In some embodiments, the computing system may be configured to obtain a second indication of a change in the permissions data. More specifically, the access/authorization rules for accessing the protected resource which are defined in the permissions data may be changed for one or more clients, and the computing system may obtain indications of such changes. For example, the computing system may receive the second indication from a client server associated with a client, or access a database storing the permissions data which may be updated by the client. The computing system may update the user permissions database based on at least one of the first indication and the second indication. That is, user permissions for accessing the protected resource may be updated based on a change in a client's employee hierarchy and/or a change in authorization policy as represented in the permissions data corresponding to the client.

In some embodiments, the computing system may perform bulk updates of the user permissions database to represent updates in access privileges for one or more groups of employees. Such bulk updates may be triggered by changes to employment-related classifications for a plurality of the client's employees, or changes to the client's authorization policy for accessing the protected resource that affects multiple employees. For example, when the employees of a subsidiary company are absorbed into the workforce of the parent company, the change in corporate hierarchical rank of the employees' immediate employer may cause their access privileges to be changed as a group. As another example, when a plurality of a client's employees are relocated to a new workplace location, said employees as a group may inherit the same access privileges that are conferred upon existing employees of the new location. Other changes in employment-related variables or authorization policy that affect multiple employees may cause the computing system to initiate a bulk update operation to update user permissions.

When a bulk update of user permissions is requested, the computing system may conduct an assessment of the requesting entity and the request prior to approving a bulk change in user permissions. For example, a subsidiary company may request that its current employees' access privileges be changed as a group. When such request for bulk update is received, the computing system may employ one or more metrics to assess whether to grant the request. In some embodiments, the computing system may obtain a "risk" metric associated with the requesting entity. The risk metric may be a measure of a level of security risk that is associated with performing bulk updates for employees of the requesting entity. This metric may gauge, for example, the trustworthiness of the requesting entity, number of employees of the requesting entity, the requesting entity's corporate policy relating to security, and security infrastructure implemented by the requesting entity. If the computing system determines that the risk metric for a requesting entity satisfies certain conditions, the request for bulk updates of user permissions may be granted. For example, if the risk metric is above a predefined threshold value, the computing system may grant a bulk update request. Other metrics (e.g. size of requesting entity, internal security level of requesting entity, etc.) may be used by the computing system in the assessment of bulk update requests.

More generally, prior to performing any bulk updates of user permissions, the computing system may be configured to assess potential risks associated with a party (e.g. businesses, individuals, etc.) that requests access privilege updates. In some embodiments, the risk assessment may be performed manually on a case-by-case basis. For example, when processing a request by an employee to update their access privilege, the computing system may check to determine whether the employee passes or has passed a test (such as a "know-your-customer" or KYC test) to verify the employee's identity. If the employee fails such test, an inquiry into the request and/or the requesting party may be initiated prior to making any adjustments to user permissions.

In some embodiments, the computing system may have access to a database storing risk profiles associated with various parties. For example, a risk profile may include an indication of the level of risk (or alternatively, level of trust- or credit-worthiness) associated with conducting business or sharing data/resources with a specific party. Upon receiving a request to process access updates, the computing system may be configured to cross-reference the database of risk profiles in order to determine whether user permissions should be updated. In particular, depending on the specific update/action that is being requested, the computing system may determine whether a risk level associated with a requesting party is an acceptable level for the update/action to be performed.

Figure 5:
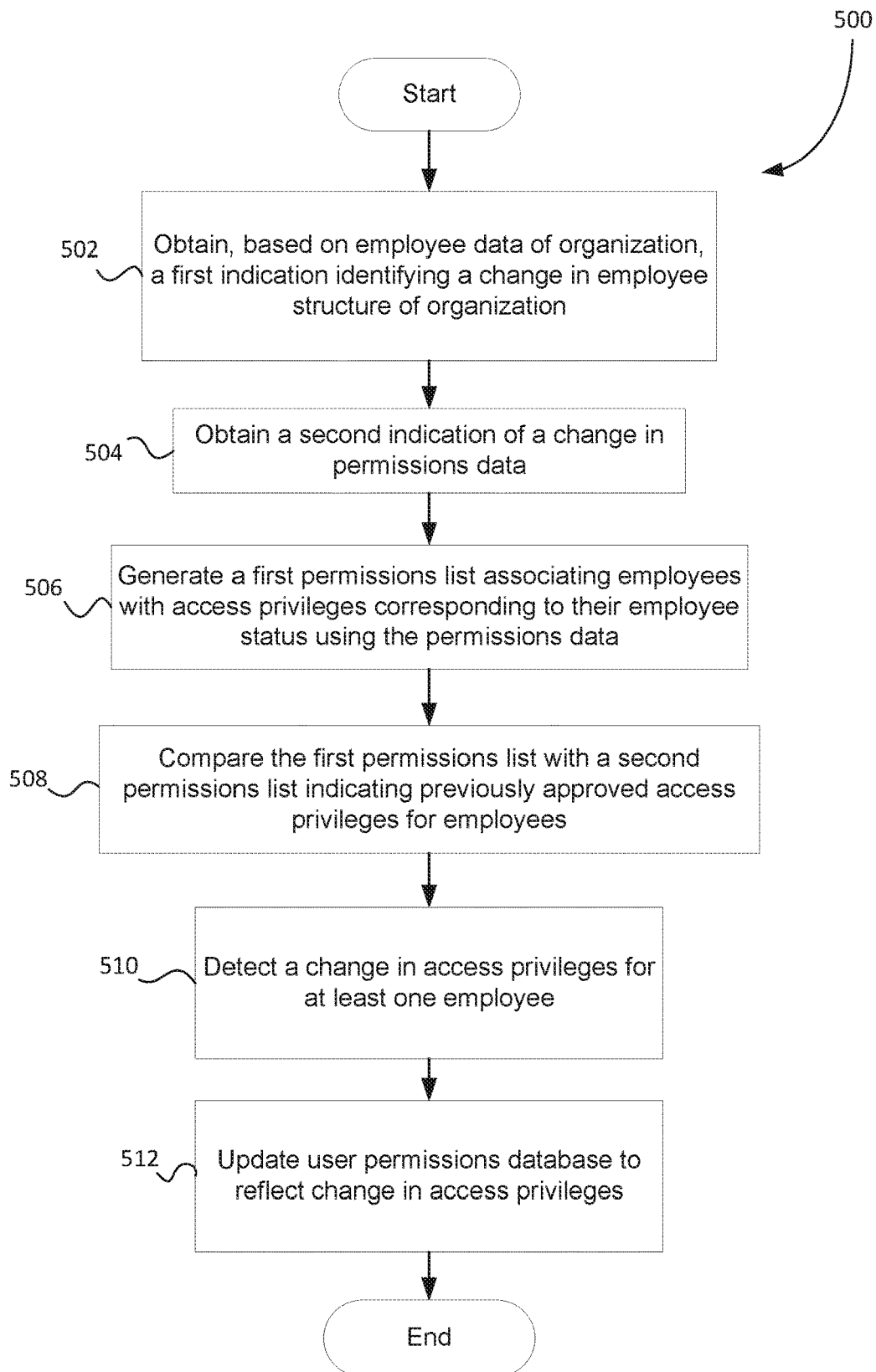
FIG. 5 shows, in flowchart form, another example method for managing access privileges for accessing a protected resource.

Reference is made to FIG. 5, which shows, in flowchart form, another example method 500 for managing access privileges for accessing a protected resource. The method 500 may be performed by a computing system, such as an ACS 150, that is configured to control access to a protected resource. The method 500 provides an illustrative example of a technique for determining changes in access privileges of employees of an organization.

In operation 502, the computing system obtains, based on employee data received from a first client server having access to a human resources database of a client organization, a first indication of a change in the client's employee hierarchy. In some embodiments, the computing system may receive the client's employee data. The employee data may indicate, for each of one or more employees within the organization, at least an employee identifier and a hierarchical rank within an employee hierarchy of the one or more employees. For example, the employee data may include names, ID's, (immediate) employer, etc. of current employees of the client organization and their associated job titles. In some cases, the employee data may additionally indicate geographic location of an employee's office or place of work and/or a corporate hierarchical rank of the employee's immediate employer. The computing system may transmit, to the first client server, a request to receive the employee data. For example, the computing system may periodically request employee data from client organizations that have one or more client accounts in a database.

In operation 504, the computing system retrieves permissions data defining access privileges associated with one or more hierarchical ranks within the first employee hierarchy for accessing the protected resource. In operation 506, the computing system generates a first permissions list based on associating the one or more employees with access privileges corresponding to their respective hierarchical rank using the retrieved permissions data. In some embodiments, the computing system may "tag" employee data received from the client by associating the employees with their respective access and/or authorization permissions, as specified by the permissions data. The first permissions list may thus contain an updated mapping of employee identifiers to access privileges for accessing the protected resource.

In operation 508, the computing system compares the first permissions list with a second permissions list that indicates previously approved access privileges for the one or more employees for accessing the protected resource. The second permissions list may be stored in a database, such as user permissions database 152, which identifies previously obtained employee data, including employee identities, rank in employee hierarchy, employees' geographic locations, corporate identifiers, etc. and approved access/authorization permissions associated with those employees.

Upon comparing the first and second permissions lists, the computing system may detect a difference in access privileges for at least one of the employees, in operation 510, as indicated in the permissions lists. For example, the computing system may determine that a hierarchical rank, geographic location, and/or employer's corporate identity associated with an existing employee has changed. That is, for an employee of the client organization that is identified in both the first and second permissions lists, various employment-related attributes associated with said employee may have changed (e.g. through promotion/demotion, relocation, corporate mergers and acquisitions, etc.). As another example, the computing system may determine that the permissions data for a client has changed. Such change may result from, for example, changes to the client's authorization policy for accessing the protected resource. A change in the authorization policy that affects the number of authorized employees or scope of authorized activities may thus be reflected in the change detected between the first and second permissions lists. As yet another example, the computing system may detect that new employees have been added to and/or removed from the client's workforce.

Upon detecting a change in access privileges for a protected resource, the computing system may determine if the change requires at least one approval from an authorized entity. Depending on the nature of the change in employee access privileges, the change may be automatically accepted at the computing system or, alternatively, the computing system may generate a request for a third party entity to verify the change.

If the change in access privileges is of a type that is predefined as being acceptable without any approval, the change may be automatically accepted by the computing system. For example, a client's authorization policy may specify that changes in access privileges resulting in an employee getting a level of authorization that is equal to or below a predetermined threshold level may be automatically accepted. Any change resulting in a level of authorization that is above the threshold level may need to be approved by authorized entities. As another example, changes in access privilege resulting from relocation of employees en masse may not require any approvals, while changes due to corporate reorganization or M&A may require approval from suitable authorities (e.g. in an M&A context, approvals from representatives of the acquirer). The specific rules governing the requirements for obtaining approvals for changes in access privileges may be obtained from a client's permissions data, a store (e.g. database) of default approval rules for the protected resource, and/or the client itself.

The computing system may generate a request to obtain approval for a change in access privileges from at least one authorized permissions management entity when a difference is detected in access privileges for at least one of the client's employees. In some embodiments, the computing system determines an identity of the at least one authorized permissions management entity. For example, the computing system may determine an identifier for at least one user from whom approval for the change is required in order for the change to be accepted and recognized in access control for the protected resource.

In some embodiments, the approvals required to be obtained for changes in a client's employee access privileges may be defined by the client. For example, listings, or "chains", representing entities that are authorized to approve a change in access privileges may be defined in an authorization policy set forth by the client for the protected resource. Such approval chains may be based, at least in part, on a current employee hierarchy for the client. In some embodiments, requests for approvals may be automatically transmitted to one or more employees that have higher hierarchical ranks than the employee for whom a change in access privilege was detected.

In at least some embodiments, the computing system may update a user permissions database (such as database 152 of FIG. 1), operation 512. The computing system may update based on receiving indication of approval of the changes in access privilege. In particular, the computing system may receive, from one or more authorized permissions management entities, an indication of approval for the changes in employee access privileges, and cause a second database containing a mapping of employee identifiers to access privileges to be updated based on the approved changes.

In at least some embodiments, the computing system may receive, from a first user device, a request to access the protected resource. That is, access requests to gain access to a protected resource may be received by the computing system from user devices. In response to receiving the request, the computing system may determine that a user associated with the first user device has access privilege for accessing the protected resource. For example, the computing system may compare a first employee identifier associated with the user against the first permissions list generated in operation 406. More generally, the computing system may reference a current, up-to-date mapping of employee identifiers to corresponding access privileges for the protected resource in order to determine whether a user-generated request to access the protected resource should be approved or rejected.

In some embodiments, employee identifiers or credentials associated with employee accounts in a human resources database of an organization may also be used for accessing or interacting with the protected resource. In particular, an authorized employee may use the employee's identifier or credentials for the HR database of the organization to approve a change in access privilege for a requesting employee. That is, employee credentials may be shared between a client's HR database and an ACS, such that a single set of credentials for an employee is recognized by both systems. The sharing of credentials can facilitate employee information integration for an ACS when a client account for the organization is created at a protected resource managed by the ACS. A single set of credentials for an employee may be accepted by the ACS for actions other than approving a change in access privilege for a protected resource. For example, the ACS may accept an employee's identifier/credentials for the HR database of the employee's organization when obtaining employee approvals for a proposed transfer of data from the organization's account at the protected resource.

Figure 6:
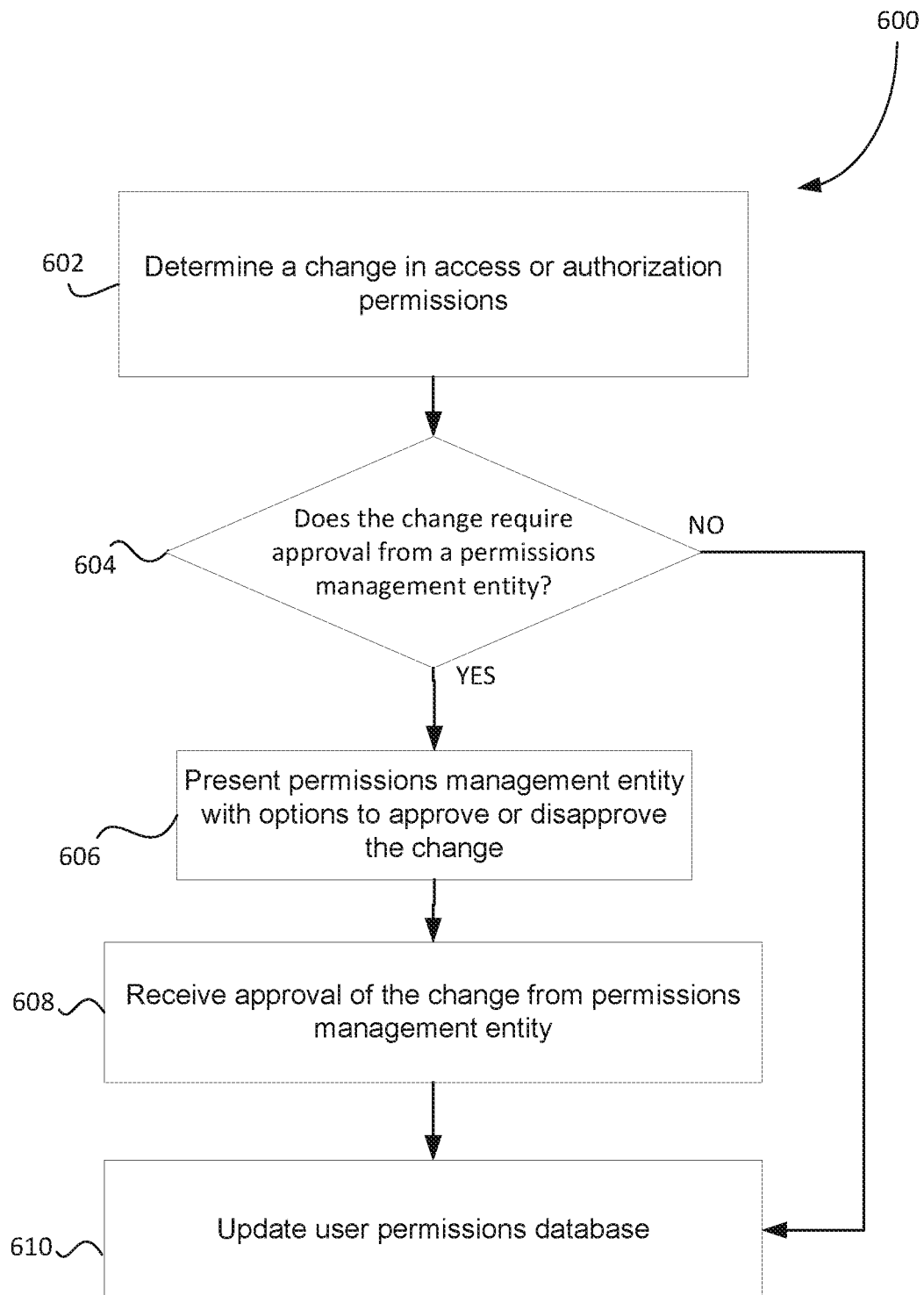
FIG. 6 shows, in flowchart form, an example method for managing a user permissions database.

Reference is now made to FIG. 6, which shows an example method 600 for managing a user permissions database associated with a protected resource. More specifically, the method 600 may be implemented in managing permissions for those entities/individuals that are authorized to access the protected resource. The method 600 may be performed by a computing system, server, module, etc. implementing access control for a protected resource. For example, the method 600 may be performed by a computing system associated with an access control system (such as ACS 150 of FIG. 1).

In operation 602, the computing system detects a change in access and/or authorization permissions for a user at a protected resource. For example, similar to operation 508 of FIG. 5, the computing system may determine that a change in access privileges for one or more employees of an organization has been effected by comparing a current mapping of employee ID's to access privileges for the protected resource with a second mapping of employee ID's to previously approved access privileges. Upon performing such comparison, the computing system may determine that the access privileges for one or more existing employees has been changed and/or that employees have been added to or removed from the client's workforce.

In response to detecting a change in access privileges, the computing system may determine whether the change requires approval from one or more permissions management entities, in operation 604. As explained above, the computing system may reference predefined rules governing the approvals required (or not required) for changes in access privileges. If approval is not required, the client employee permissions database may be automatically updated to reflect the changes in access privileges. That is, the access privileges associated with the employee for whom change was detected may be updated to represent the most recent permissions data for the employee.

If the change in access privileges is determined to be one that requires approval, the computing system may identify the relevant permissions management entity that is authorized to approve the change. For example, the computing system may query the client's authorization policy, employee hierarchy data, and/or default access control settings for the protected resource in order to identify a permissions management entity. In some embodiments, rules for determining the identities of authorized approvers of specific types of changes may be defined in a client's authorization policy (or a database associated therewith), a data store of default rules for the protected resource, or obtained from the client. As an example, default rules may indicate that when handling changes in access privileges for an employee that result in the employee acquiring a level of authorization that is below a predetermined threshold, the changes may be approved by those employees that have higher rank than the employee in the employee hierarchy. As another example, default rules may indicate that certain types of changes in access privilege (e.g. those resulting from geographic relocation of employees, corporate reorganization, etc.) must be approved by all or a subset of a predetermined group of entities/individuals.

In operation 606, the computing system presents the identified permissions management entity with options to approve or disapprove the change in access privileges. The computing system may, for example, generate a request to obtain approval for the change in access privileges. In some embodiments, the generated request may be transmitted as a message to one or more authorized permissions management entities. The request may indicate an employee identifier and details of the change (e.g. previous permissions compared to current permissions) in access or authorization permissions. In some other embodiments, the computing system may configure account data for accounts at a protected resource (e.g. database) that are associated with users authorized to approve the change such that upon the users accessing their own accounts, they may be presented with options to approve or disapprove the change in access privileges for the employee for whom change was detected.

In some embodiments, the request for approval may be transmitted to a single entity with a time-out condition, such that the request may be forwarded to a next available authorized entity upon the expiration of a predefined time-out period. The request for approval may be forwarded to multiple entities that are each authorized to approve the change in access privilege.

In operation 608, the computing system receives approval of the change from at least one of the permissions management entities that are authorized to approve the change. The client employee permissions database may then be updated to reflect the approved change, in operation 610.

Figure 7:
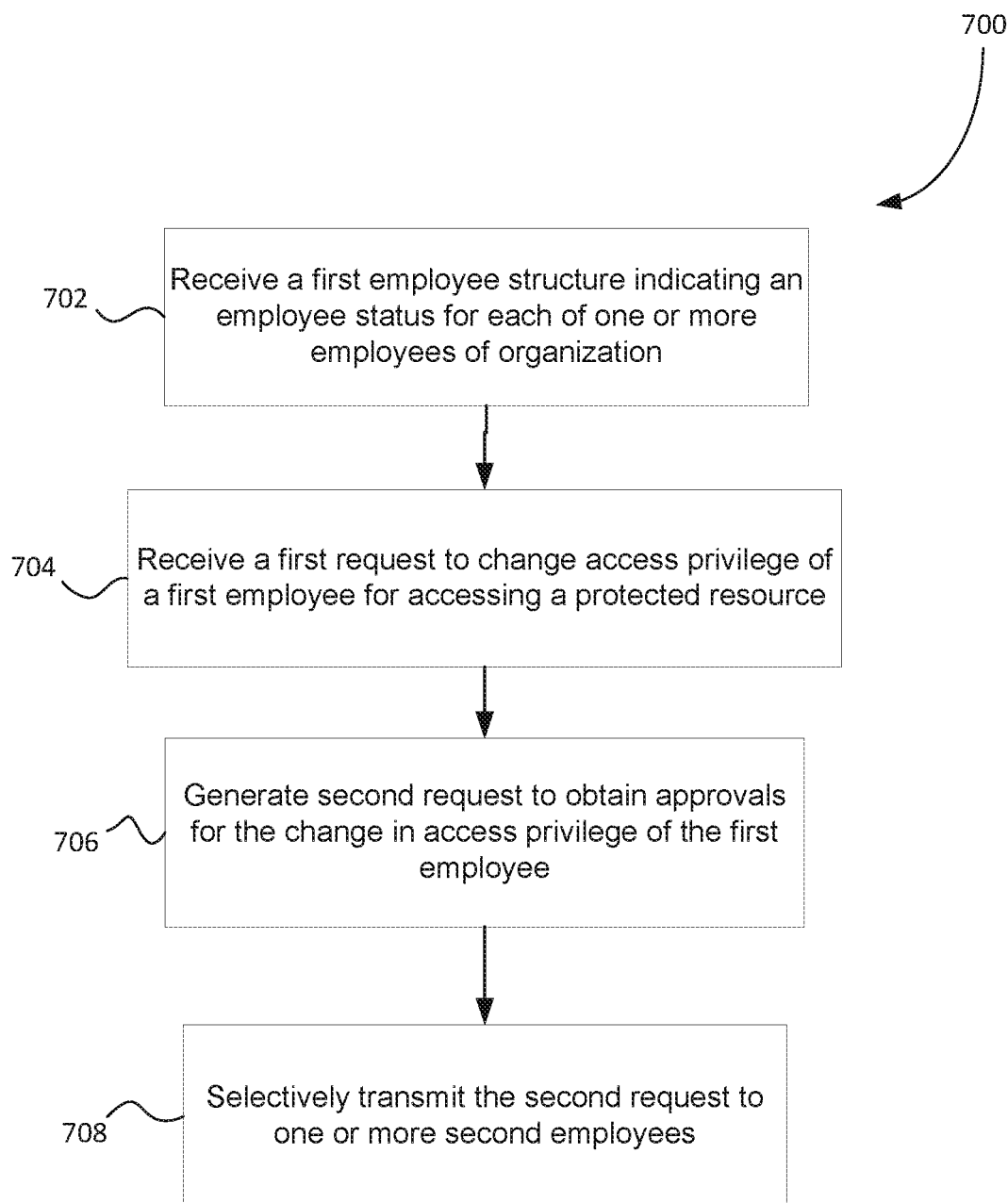
FIG. 7 shows, in flowchart form, an example method for handling requests to obtain approval for changes in access privileges for accessing a protected resource.

Reference is now made to FIG. 7, which shows, in flowchart form, an example method 700 for handling requests to obtain approval for changes in access privileges for accessing a protected resource. The method 700 may be performed by a computing system, server, module, etc. implementing access control for a protected resource, such as ACS 150 of FIG. 1.

In operation 702, the computing system receives, from a first client server having access to a human resources database of a client organization, first employee data. The first employee data includes, for each of one or more employees within the organization, an employee identifier, and a hierarchical rank within an employee hierarchy of the one or more employees.

In operation 704, the computing system receives a first request to change access privilege of one of the employees for accessing a protected resource. The first request may be manually transmitted by an employee associated with the change or an administrator of a client server associated with the client organization. The request may also be generated by the computing system itself in response to detecting that a change in access privilege for an employee at the protected resource has been effected.

In operation 706, the computing system generates a second request to obtain approvals for the change in access privilege for the employee. The second request is then transmitted to one or more second employees, in operation 708. In particular, the computing system determines one or more second employees that are authorized to provide approval for the change in access privilege for the employee. The one or more second employees may be determined based, at least in part, on a first employee hierarchy for the client organization. The authorized approvers may, for example, be those employees that have higher hierarchical rank than the employee for whom changed in access privilege was detected. The one or more second employees may also correspond to a group, or "chain", representing those individuals that are specified in a predefined rule/policy for the client organization as being authorized to approve changes in access privilege for the employee. The computing system may be configured to cross-reference an "approval chain" of employees, the employee structure (e.g. hierarchy of employees) for the client, and the nature of the specific change in access privilege in order to obtain the first set of employees.

The approval chain for a specific change in access privilege may be customized by a client. For example, a client may specify the types of changes (e.g. promotion/demotion, relocation, corporate reorganization, etc.) and the particular subsets of entities that are authorized to approve those types of changes. The type and nature of the required approvals may also be specified by predetermined rules for a client. A change in access privilege may, for example, require approvals from a predefined number of entities or all entities specified by the client, in order for the change to be accepted by an access control system.

Once the one or more second employees are identified, the computing system selectively transmits the second request for approval to the one or more second employees. In some embodiments, the second request may be transmitted to all or a subset of the one or more second employees. For example, the request may be sent to an individual employee authorized to approve the change with a time-out condition that specifies a time-out period. In response to expiry of the time-out period, the request may be transmitted to a different one of the second employees with the same (or different) time-out condition. The order of sending may, for example, depend on the organization's employee hierarchy. For example, the request may first be sent as a message to the employee having the lowest rank and may, after expiry of the time-out period, may be sent to the employee having the second lowest rank, and so on.

Figure 8:
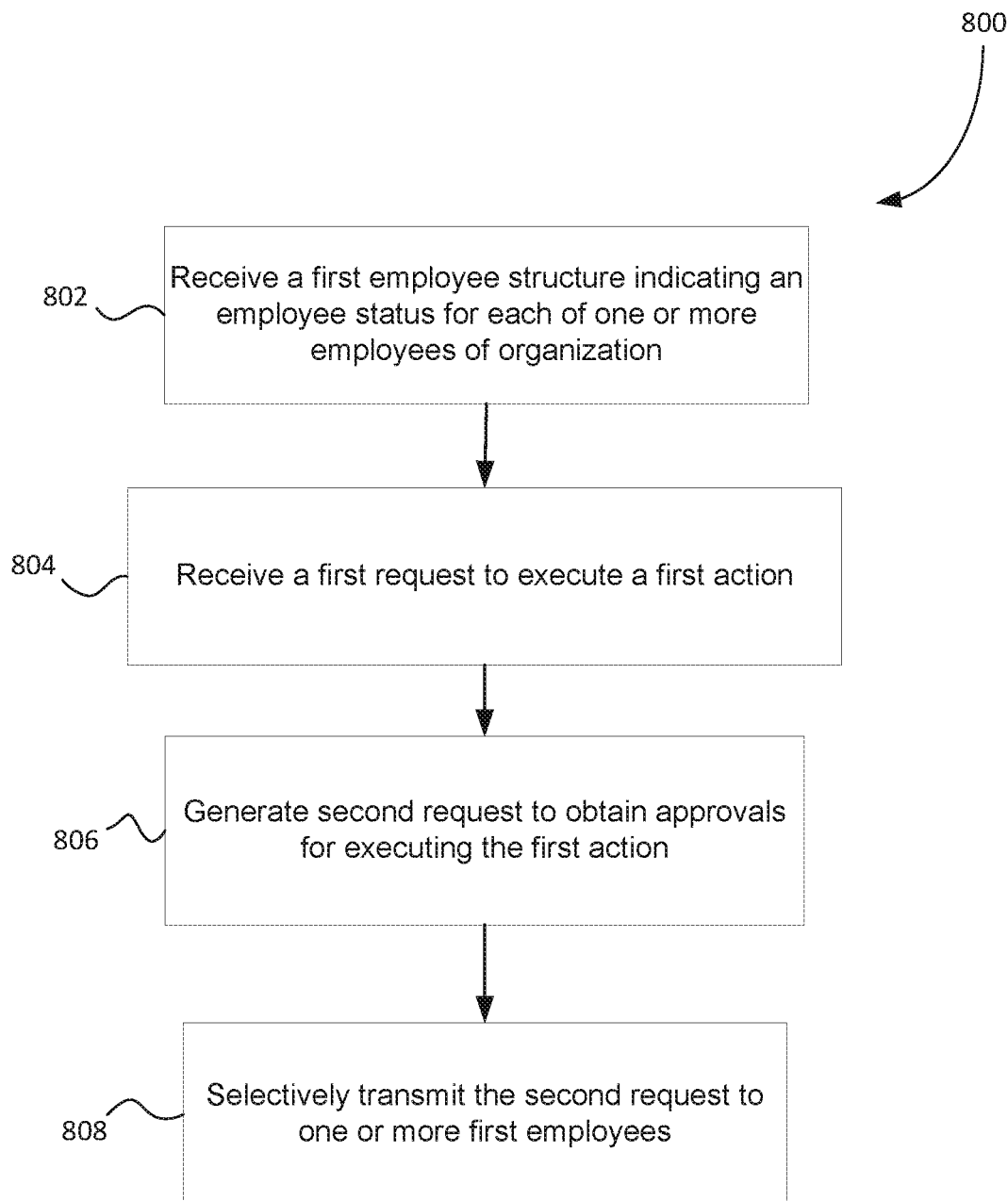
FIG. 8 shows, in flowchart form, an example method for handling requests to obtain approval for executing an action.

Reference is now made to FIG. 8, which shows, in flowchart form, an example method 800 of handling requests to obtain approval for executing an action. The method 800 may be performed by a computing system, server, module, etc. implementing access control for a protected resource, such as ACS 150 of FIG. 1. Alternatively, the method 800 may be performed by a system for authorizing data transfers between two or more entities. More specifically, the method 800 may be included in a process for authorizing data transfers by obtaining express approvals from one or more parties.

In operation 802, the computing system receives, from a first client server having access to a human resources database of a client organization, first employee structure. The first employee structure indicates, at least, an employee status associated with each of one or more employees of the organization. For example, the first employee structure data may include employee hierarchy information for the organization, specifying a hierarchical rank for each employee within the employee hierarchy. The HR database of the client organization may be of the types described above.

In operation 804, the computing system receives, from a requesting device, a first request to execute a first action. The first action may, for example, be a transfer of data from a first entity to one or more second entities. Data may be transferred from a first account at a protected resource to one or more different accounts at the protected resource or to accounts that are maintained externally. The request may be manually transmitted by an employee associated with the change or an administrator of a client server associated with the client organization, through interaction with a computing system or device.

In operation 806, the computing system generates a second request to obtain approvals for executing the first action. The second request may indicate, for example, an identifier of the requesting party/device, the first action, and a timestamp associated with the request.

In operation 808, the computing system selectively transmits the second request to one or more first employees. The first employees are identified based, at least in part, on the first employee structure. In at least some embodiments, the computing system determines at least one first condition associated with approvals that are required for executing the first action. For example, a first condition may indicate a minimum number of approvals that are required to be obtained for executing the first action. As another example, a first condition may specify hierarchical ranks of employees whose approvals are necessary or sufficient for executing the first action. The one or more first conditions may also be combinations of conditions relating to number of necessary approvals and hierarchical ranks (or titles, experience, security clearance, etc.) of approving employees. For example, the first conditions may specify one or more hierarchical ranks of employees and a number of approvals for each of the one or more hierarchical ranks that are required for approving execution of the first action.

In some embodiments, the at least one first condition may depend on a type of action that is requested to be executed. For example, an action which may require an elevated level of security (e.g. transfer of sensitive or confidential data) may be associated with first conditions specifying that multiple approvals from high ranking employees are needed to approve execution of the action. More generally, the at least one first condition may depend on various factors, such as: type of action; in the case of a data transfer, type and quantity of data transferred; and identity of the entity requesting execution of the action. In some cases, these factors may be incorporated into a client organization's policy for authorizing various different actions for or on behalf of the client. For example, a client's authorization policy may be stored in a profile associated with the client's account at a database that is accessible by the computing system.

In some embodiments, the computing system may identify the one or more first employees (for transmitting the second request) based on determining that approvals from said first employees satisfy the at least one first condition. For example, a set of employees whose approvals are sufficient for authorizing the first action may be ascertained, and the second request may be transmitted to at least one employee of the set. The number and specific identifies of employees to whom the second request is transmitted may depend on the at least one first condition. The second request may be transmitted by the computing system to one or more of such first employees of the set concurrently.

In some embodiments, the computing system is configured to receive, from at least one of the first employees, indications of approval for executing the first action. That is, the computing system may receive responses to the second requests that it transmits to the one or more first employees. In such cases, the computing system may transmit the second request along an "approval chain" of employees. The second request may first be transmitted to a first one of the first employees. If a response in the form of an indication of approval is received from the first one of the first employees, the computing system determines whether the indications of approval received at the computing system satisfy the first conditions for executing the first action. That is, the computing system may collect those indications of approval that are associated with a certain request, and determine whether the collected indications of approval are sufficient for executing the first action. If the received indications of approval do not satisfy the first conditions, the second request is transmitted to further ones of the first employees. On the other hand, if the received indications of approval satisfy the first conditions, the computing system may be configured to notify the requesting device/party that execution of the first action is approved.

In at least some embodiments, the computing system may itself execute the first action upon confirming that the first action is approved. The first action may, for example, be a transfer of data between user accounts in a database that is accessible by the computing system. The sending account (i.e. account from which data transfer originates) may be an account that is associated with the client organization. Upon confirming that sufficient approval of the first action has been obtained, the computing system may execute the data transfer, from the client account to another user account. As another example, the first action may be access of a protected resource, such as a database. If sufficient approval is obtained for a requesting entity to access the protected resource, the computing system may grant, to the entity, authority to access the resource. As yet another example, the first action may be contract execution. Upon garnering requisite approval from authorized employees of the organization, the computing system may be configured to complete a contract execution process.

An "approval chain" for a certain action may be defined in one or more predetermined rules that are specific to the client organization, or it may be specified as part of the first request from the requesting device. The "approval chain" may also be determined based on the at least one first condition associated with approvals that are required for executing the first action. Such first conditions may be obtained by the computing system from the client organization or from a database storing rules governing employee approvals for authorizing predefined actions.

The second request may be transmitted along an "approval chain" in various different ways. In some embodiments, the second request may be transmitted to a first one of the one or more first employees with a "time-out" condition. More specifically, in response to determining that an indication of approval is not received from the first one of the first employees prior to expiry of a time-out period, the second request may be transmitted to a different one of the first employees. The different one of the first employees may be selected, for example, based on determining that the employee has a same rank or higher rank as the first one of the first employees in an employee hierarchy of the organization. In particular, an "approval chain" may not be predefined for a certain action; instead, an "approval chain" may comprise a "chain" of employees that are qualified to provide authorization for the action due to their specific employee status, such as hierarchical rank, responsibilities, etc.

Upon receiving indications of approval from one or more employees, the computing system may record the indications in a database. For example, received indications may be recorded in a database that stores various data relating to the indications, including source (i.e. employee) of approval, timestamps (e.g. time of approval, time of receipt of indication of approval), signatures (e.g. digital signatures) for future auditing purposes, update/action performed, etc. The database may be associated with the protected resource, the organization, and/or accounts of the various parties providing indications of approval.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
   a communications module communicable with an external network;
   a memory; and
   a processor coupled to the communications module and the memory, the processor being configured to:
      obtain, based on employee data received from a first client server having access to a human resources database of an organization, a first indication identifying a change in a first employee hierarchical structure of the organization, the first employee hierarchical structure indicating an employee hierarchical rank associated with each of one or more of the employees;
      identify a change in access privileges for at least one employee of the organization based on:
         determining a first permissions list including an updated a-mapping of employee identifiers to access privileges for accessing the protected resource associated with the change in the first employee hierarchical structure;
         comparing the first permissions list with a second permissions list that indicates previously approved access privileges for the one or more employees; and
         identifying a difference in access privileges for at least one employee based on the comparing;
      determine that the change in access privileges for the at least one employee requires approval from at least one authorized permissions management entity;
      configure account data of an account at the protected resource that is associated with the at least one authorized permissions management entity to present options for approving the change in access privileges upon access of the account by the at least one authorized permissions management entity;
      receive, from the at least one authorized permissions management entity, an indication of approval for the change in access privileges; and
      in response to receiving the indication of approval, update a user permissions database associated with the protected resource to indicate the change in access privileges for the at least one employee, the user permissions database indicating access privileges for employees of the organization that are authorized to access the protected resource.

2. The computing device of claim 1, wherein the processor is further configured to obtain a second indication of a change in the permissions data, and wherein the user permissions database is updated based on at least one of the first indication and the second indication.

3. The computing device of claim 1, wherein the processor is further configured to transmit, to the first client server, a request to receive the employee data.

4. The computing device of claim 1, wherein the permissions data comprises a mapping of employee statuses to corresponding access privileges for accessing the protected resource.

5. The computing device of claim 1, wherein the processor is further configured to:
   receive, from a first user device, a request to access the protected resource; and
   determine that a user associated with the first user device has access privilege for accessing the protected resource.

6. The computing device of claim 5, wherein determining that the user associated with the first user device has access privilege comprises comparing a first employee identifier associated with the user against the user permissions database.

7. The computing device of claim 1, wherein the processor is further configured to transmit, to the at least one authorized permissions management entity, a message requesting to obtain approval for the change in access privileges.

8. A method for managing access privileges, comprising:
   obtaining, based on employee data received from a first client server having access to a human resources database of an organization, a first indication identifying a change in a first employee hierarchical structure of the organization, the first employee hierarchical structure indicating an employee hierarchical rank associated with each of one or more of the employees;

identifying a change in access privileges for at least one employee of the organization based on:
  determining a first permissions list including an updated a-mapping of employee identifiers to access privileges for accessing the protected resource associated with the change in the first employee hierarchical structure;
  comparing the first permissions list with a second permissions list that indicates previously approved access privileges for the one or more employees; and
  identifying a difference in access privileges for at least one employee based on the comparing;

determining that the change in access privileges for the at least one employee requires approval from at least one authorized permissions management entity;

configuring account data of an account at the protected resource that is associated with the at least one authorized permissions management entity to present options for approving the change in access privileges upon access of the account by the at least one authorized permissions management entity;

receiving, from the at least one authorized permissions management entity, an indication of approval for the change in access privileges; and in response to receiving the indication of approval, updating a user permissions database associated with the protected resource to indicate the change in access privileges for the at least one employee, the user permissions database indicating access privileges for employees of the organization that are authorized to access the protected resource.

9. The method of claim 8, further comprising obtaining a second indication of a change in the permissions data, and wherein the user permissions database is updated based on at least one of the first indication and the second indication.

10. The method of claim 8, further comprising transmitting, to the first client server, a request to receive the employee data.

11. The method of claim 8, wherein the permissions data comprises a mapping of employee statuses to corresponding access privileges for accessing the protected resource.

12. The method of claim 8, further comprising:
  receiving, from a first user device, a request to access the protected resource; and
  determining that a user associated with the first user device has access privilege for accessing the protected resource.

13. The method of claim 12, wherein determining that the user associated with the first user device has access privilege comprises comparing a first employee identifier associated with the user against the user permissions database.

14. The method of claim 8, further comprising transmitting, to the at least one authorized permissions management entity, a message requesting to obtain approval for the change in access privileges.

* * * * *